US011933071B2

(12) United States Patent
Ben-Aharon et al.

(10) Patent No.: US 11,933,071 B2
(45) Date of Patent: Mar. 19, 2024

(54) KEY COMBINATION ELEMENT IN KEY BLANK AND KEY

(71) Applicant: Mul-T-Lock Technologies Ltd., Yavne (IL)

(72) Inventors: Effi Ben-Aharon, Hod HaSharon (IL); Izhak Kaiser, Petach Tikva (IL); Eyal Morsky, Holon (IL)

(73) Assignee: Mul-T-Lock Technologies Ltd., Yavne (IL)

( * ) Notice: Subject to any disclaimer, the term of this patent is extended or adjusted under 35 U.S.C. 154(b) by 337 days.

(21) Appl. No.: 17/424,595

(22) PCT Filed: Jan. 8, 2020

(86) PCT No.: PCT/IL2020/050028
§ 371 (c)(1),
(2) Date: Jul. 21, 2021

(87) PCT Pub. No.: WO2020/157742
PCT Pub. Date: Aug. 6, 2020

(65) Prior Publication Data

US 2022/0098897 A1 Mar. 31, 2022

(30) Foreign Application Priority Data

Jan. 29, 2019 (IL) .......................................... 264518

(51) Int. Cl.
*E05B 35/00* (2006.01)
*E05B 19/00* (2006.01)
(Continued)

(52) U.S. Cl.
CPC ........ *E05B 35/004* (2013.01); *E05B 19/0058* (2013.01); *E05B 27/0021* (2013.01); *E05B 27/0042* (2013.01); *E05B 27/10* (2021.08)

(58) Field of Classification Search
CPC ............. E05B 19/0017; E05B 19/0052; E05B 19/0058; E05B 27/0021; E05B 27/0042; E05B 27/10; E05B 35/003; E05B 35/004
See application file for complete search history.

(56) References Cited

U.S. PATENT DOCUMENTS 507,408 A * 10/1893 Bole ..................... E05B 35/004 70/399
619,202 A * 2/1899 Mirot .................. E05B 63/0017 70/404
(Continued)

FOREIGN PATENT DOCUMENTS

EP 3103944 12/2016
WO 2009/147660 12/2009
(Continued)

OTHER PUBLICATIONS

PCT Search Report and Written Opinion PCT/IL2020/050028, dated Jun. 23, 2020.

*Primary Examiner* — Christopher J Boswell
(74) *Attorney, Agent, or Firm* — Dekel Patent Ltd.; David Klein

(57) ABSTRACT

A key device includes a generally elongate shaft portion that has first and second oppositely directed side surfaces, at least one of which is cuttable to form key cuts that define a key combination surface. First and second key combination elements, disposed in the elongate shaft portion, are side-by-side one another at different lateral positions along the width of the elongate shaft portion and located at overlapping longitudinal positions along the length of the elongate shaft portion. The first and second key combination elements are each pivotable about a pivot axis.

13 Claims, 2 Drawing Sheets

(51) Int. Cl.
*E05B 27/00* (2006.01)
*E05B 27/10* (2006.01)

(56) References Cited

U.S. PATENT DOCUMENTS 5,170,651 A * 12/1992 Errani .................. E05B 35/004 70/395
5,724,841 A * 3/1998 Botteon ................ E05B 35/004 70/395
5,775,144 A * 7/1998 Pagalday .............. E05B 35/004 70/358
5,934,119 A * 8/1999 Keller ................. E05B 27/0021 70/276
5,966,971 A * 10/1999 Keller ................. E05B 27/0021 70/378
7,647,799 B2 * 1/2010 Markbreit ........... E05B 27/0042 70/495
8,387,425 B2 * 3/2013 Ben-Aharon ........... E05B 19/00 70/411
8,950,226 B2 * 2/2015 Dolev ................. E05B 19/0058 70/395

FOREIGN PATENT DOCUMENTS

WO 2013/055877 4/2013
WO 2015/063755 5/2015

* cited by examiner

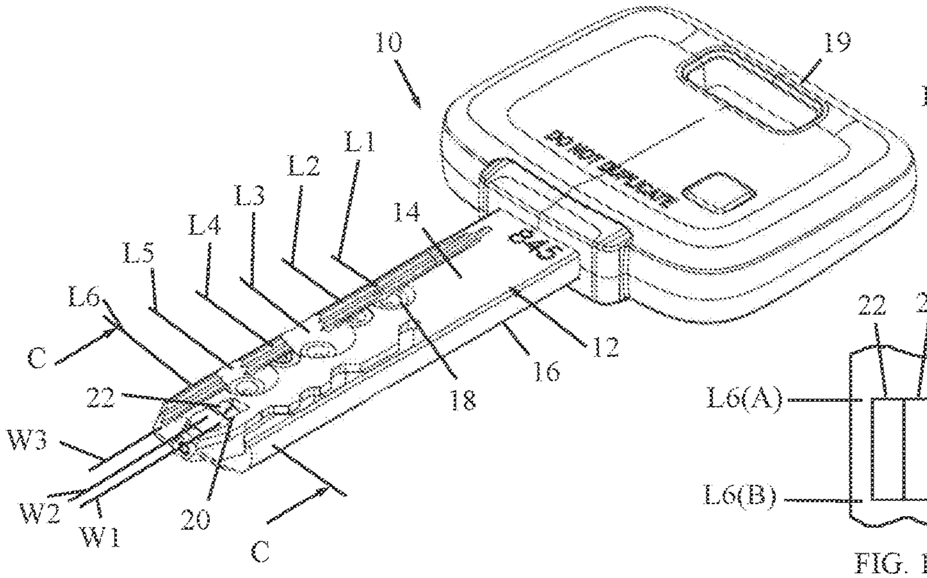
FIG. 1
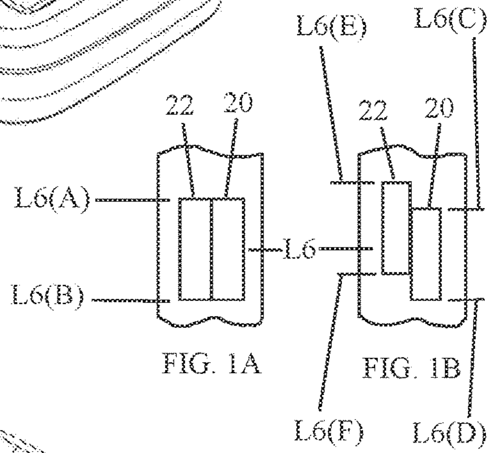
FIG. 1A
FIG. 1B
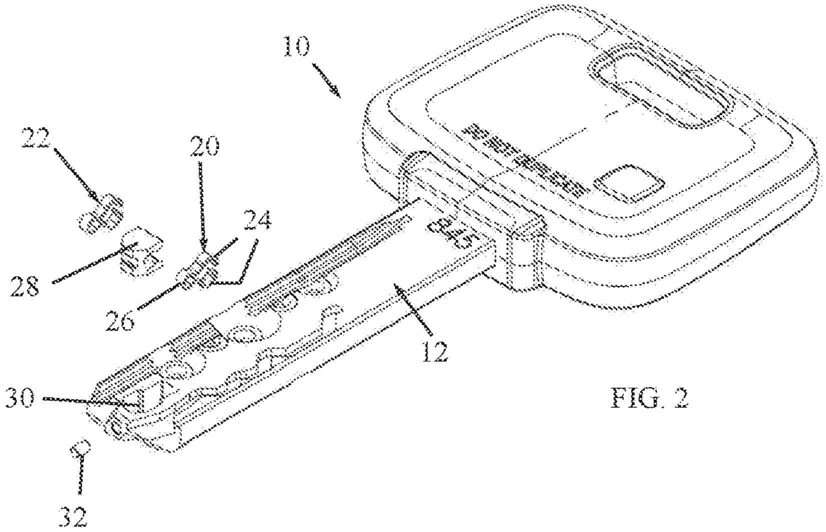
FIG. 2
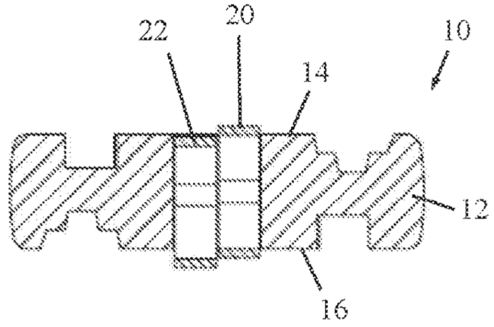
FIG. 3

KEY COMBINATION ELEMENT IN KEY BLANK AND KEY

FIELD OF THE INVENTION

The present invention relates to locking apparatus generally and more particularly to a key combination element movably disposed in a key blank or key, and to locks actuated thereby.

BACKGROUND OF THE INVENTION

U.S. Pat. No. 7,647,799 describes a key blank including a key combination element (e.g., a spring) that is movably disposed in the shaft of the key blank and adapted for touching a lock combination element disposed in a cylinder lock plug. The key combination element has inherent energy for applying an urging force against the lock combination element. The key combination element can resiliently protrude outwards beyond both the first and second side surfaces. The key combination element may be embodied as an alpha-shaped spring. Such a key blank is commercially available from Mul-T-Lock Technologies Ltd., Israel, under the trademark MT5.

SUMMARY OF THE INVENTION

The present invention seeks to provide a novel key device and lock therefor, as is described more in detail hereinbelow.

It is noted that throughout the specification and claims the term "key device" refers to a key blank or a key made from a key blank with key cuts formed thereon.

The key device of the present invention is similar to the key device of U.S. Pat. No. 7,647,799, but differs therefrom, among other things, by having first and second key combination elements that are positioned side-by-side one another in the elongate shaft portion of the key device. The first and second key combination elements are movable independently of each other. This provides unique features when the key device is used with a cylinder lock. For example, only one of the key combination elements may be active to bring pins in the cylinder lock to the shear line while the other one of the key combination elements is not used to bring anything to the shear line and instead abuts against structure in the plug of the cylinder lock. In this manner, the key device of the present invention can operate (unlock and lock) a cylinder lock of the present invention, as well as a cylinder lock designed for the key device of U.S. Pat. No. 7,647,799 (i.e., the key device of the present invention has backward compatibility). However, the key device of U.S. Pat. No. 7,647,799 cannot operate the cylinder lock of the present invention because the key combination element (alpha-shaped spring) of U.S. Pat. No. 7,647,799 is too wide and abuts against structure in the cylinder lock plug and cannot bring the cylinder lock pins to the shear line.

The key device of the present invention may be embodied as an irreversible key (only one side operates a cylinder lock) or a reversible key (both sides of the key can operate the cylinder lock). In the case of a reversible key, if the key is inserted into the keyway of the cylinder lock with the first key combination element facing the pins of the plug, then only the first key combination element is active to bring pins in the cylinder lock to the shear line while the second key combination element is not used to bring anything to the shear line and instead abuts against structure in the plug of the cylinder lock. Conversely, if the key is inserted into the keyway of the cylinder lock with the second key combination element facing the pins of the plug, then only the second key combination element is active to bring pins in the cylinder lock to the shear line while the first key combination element is not used to bring anything to the shear line and instead abuts against structure in the plug of the cylinder lock. If such a reversible key of the invention were to be inserted into the keyway of a cylinder lock designed for the key device of U.S. Pat. No. 7,647,799, then no matter which side the key of the invention faces, both the first and second key combination elements are active to bring pins in the cylinder lock to the shear line.

The first and second key combination elements of the present invention are relatively narrow (e.g., half the width) as compared with the key combination element of U.S. Pat. No. 7,647,799. This presents a technical problem: the key combination elements of the present invention must have sufficient strength (leverage) to overcome the springs used with the pins of the cylinder lock (both of the present invention and that of U.S. Pat. No. 7,647,799) despite their narrow width. The inventors have found that first and second key combination elements made of steel alloys (such as, but not limited to, 17-4 PH martensitic stainless steel) possess the requisite strength for backward compatibility.

There is thus provided in accordance with a non-limiting embodiment of the present invention a key device including a generally elongate shaft portion having a length and a width that respectively define longitudinal and lateral positions along the elongate shaft portion, the elongate shaft portion including first and second oppositely directed side surfaces, at least one of which is cuttable to form key cuts that define a key combination surface, and first and second key combination elements, disposed in the elongate shaft portion, side-by-side one another at different lateral positions along the width of the elongate shaft portion and located at overlapping longitudinal positions along the length of the elongate shaft portion, wherein the first and second key combination elements are each pivotable about a pivot axis. The first and second key combination elements may be independently active biasing elements, capable of providing a biasing force independently from one another.

In accordance with an embodiment of the present invention the first and second key combination elements are capable of resiliently protruding outwards, independently from one another, beyond at least one of the first and second side surfaces.

In accordance with an embodiment of the present invention the pivot axis extends along a width of the elongate shaft portion.

In accordance with an embodiment of the present invention the first and second key combination elements are pivotable about a common pivot axis.

In accordance with an embodiment of the present invention the first and second key combination elements are each disposed in a recess (e.g., common recess) formed in the elongate shaft portion.

In accordance with an embodiment of the present invention each of the first and second key combination elements includes a pair of resilient arms extending from a common base which is pivotally mounted in an insert mounted in the elongate shaft portion.

There is also provided in accordance with a non-limiting embodiment of the present invention key device and lock assembly including a cylinder lock housing including a driver pin movable to a shear line, a plug having a keyway and rotatable relative to the cylinder lock housing along the shear line the plug including a plug pin aligned with the driver pin and movable to the shear line, and a key device including a generally elongate shaft portion having a length and a width that respectively define longitudinal and lateral positions along the elongate shaft portion, the elongate shaft portion including first and second oppositely directed side surfaces, at least one of which is cuttable to form key cuts that define a key combination surface, and first and second key combination elements, disposed in the elongate shaft portion, side-by-side one another at different lateral positions along the width of the elongate shaft portion and located at overlapping longitudinal positions along the length of the elongate shaft portion, wherein the first and second key combination elements are each pivotable about a pivot axis, wherein insertion of the key device into the keyway aligns one of the first and second key combination elements with the plug pin to urge the plug pin to the shear line to allow rotation of the plug and the other one of the first and second key combination elements abuts against a portion of the plug and not against the plug pin.

In accordance with an embodiment of the present invention a first biasing device, e.g., disposed in the cylinder lock housing, is configured to urge the driver pin towards the shear line and a second biasing device, e.g., disposed in the cylinder lock housing, is configured to urge the driver pin away from the shear line.

In accordance with an embodiment of the present invention the second biasing device adds to an urging force of the one of the first and second key combination elements to urge the plug pin to the shear line.

In accordance with an embodiment of the present invention the plug pin and the driver pin include telescoping pins.

BRIEF DESCRIPTION OF THE DRAWINGS

The present invention will be understood and appreciated more fully from the following detailed description, taken in conjunction with the drawings in which:

FIG. 1 is a simplified perspective illustration of a key device, constructed and operative in accordance with a non-limiting embodiment of the present invention;

FIG. 1A and FIG. 1B are simplified illustrations of fully overlapped longitudinal positions and partially overlapped longitudinal positions, respectively, of first and second key combination elements in the key device;

FIG. 2 is a simplified partially-exploded illustration of the key device, highlighting first and second key combination elements that are positioned side-by-side one another in an elongate shaft portion of the key device;

FIG. 3 is a sectional illustration of the first and second key combination elements, taken along lines C-C in FIG. 1.

DETAILED DESCRIPTION OF EMBODIMENTS

Figure 4:
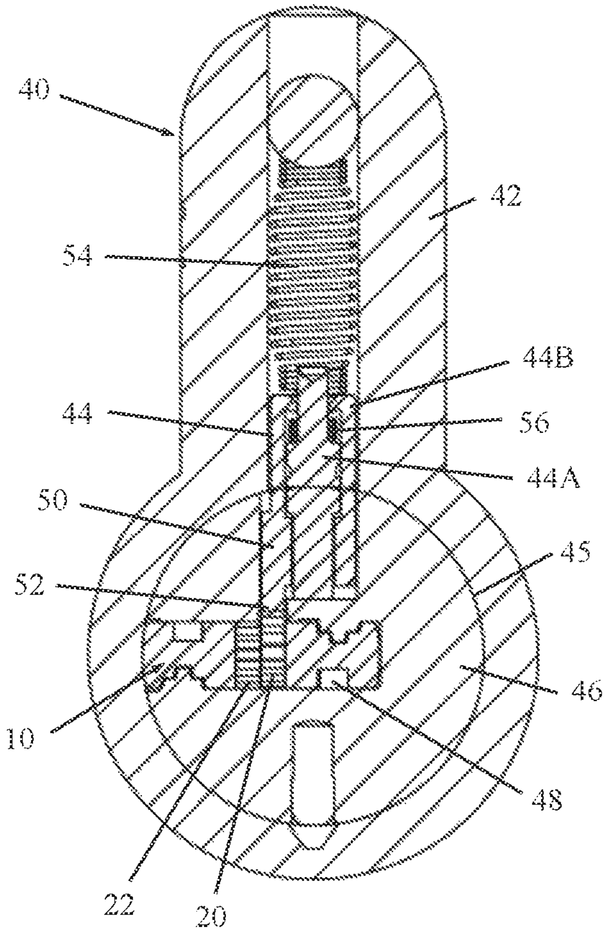
FIG. 4 is a transverse sectional illustration of a cylinder lock, constructed and operative in accordance with a non-limiting embodiment of the present invention, showing the orientation of the first and second key combination elements when the lock elements of the cylinder lock are aligned along the shear line.

Reference is now made to FIG. 1, which illustrates a key device 10, constructed and operative in accordance with a non-limiting embodiment of the present invention.

Key device 10 includes a generally elongate shaft portion 12 including first and second (e.g., generally flat) oppositely directed side surfaces 14 and 16, at least one of which is cuttable to form key cuts 18 that define a key combination surface. As is known in the art, if only one of the surfaces 14 or 16 has key cuts or the key cuts are different, then the key device is an irreversible key device; if both surfaces 14 and 16 have identical key cuts, then the key device is a reversible key device. Key device 10 may include a head 19.

The elongate shaft portion 12 has a length and a width that respectively define longitudinal and lateral positions along the elongate shaft portion 12. For example, key cuts are shown cut at longitudinal positions L1-L5, all of which are at lateral position W3.

In accordance with a non-limiting embodiment of the present invention, first and second key combination elements 20 and 22 are disposed in the elongate shaft portion 12. Elements 20 and 22 are positioned side-by-side one another at different lateral positions (e.g., W1 and W2) along the width of elongate shaft portion 12, at overlapping longitudinal positions along the length of elongate shaft portion 12.

The meaning of "overlapping longitudinal positions" is explained with further reference to FIGS. 1A and 1B. As seen in FIGS. 1 and 1A, first and second key combination elements 20 and 22 are positioned at identical longitudinal positions, that is, the same longitudinal position L6 which passes through the longitudinal center of the elements 20 and 22 and the longitudinal ends of elements 20 and 22 are at identical longitudinal positions L6(A) and L6(B). However, the invention also contemplates the situation shown in FIG. 1B, wherein the longitudinal ends of elements 20 and 22 are at different longitudinal positions (L6(C) and L6(D) for element 20 and L6(E) and L6(F) for element 22), but longitudinal position L6 still passes through both of first and second key combination elements 20 and 22. Thus, the term "overlapping longitudinal positions" includes fully overlapped longitudinal positions (FIG. 1A) and partially overlapped longitudinal positions (FIG. 1B).

First and second key combination elements 20 and 22 are independently active biasing elements, that is, each one is capable of providing a biasing or urging force independently from one another. For example, first and second key combination elements 20 and 22 may be capable of resiliently protruding outwards, independently from one another, beyond one of, or both of, first and second side surfaces 14 and 16, as seen in FIG. 3. In another example, first and second key combination elements 20 and 22 do not have to protrude beyond any of first and second side surfaces 14 and 16; but elements 20 in any case provide a biasing force (spring force) to interact with pins in the cylinder lock to achieve movement to the shear line.

There may be two or more such combination elements, that is, one first key combination element and one second key combination element, or more than one first key combination element and more than one second key combination element. Accordingly, the terms "first key combination element" and "second key combination element" throughout the description and claims mean at least one first key combination element and at least one second key combination element, respectively.

Reference is now made to FIG. 2. In accordance with an embodiment of the present invention each of the first and second key combination elements 20 and 22 includes a pair of resilient arms 24 extending from a common base 26 which is pivotally mounted in an insert 28 mounted in a recess 30 formed in the elongate shaft portion. Accordingly, first and second key combination elements 20 and 22 are each disposed in recess 30 (e.g., a common recess for both elements, but could be a separate recess for each one). Insert 28 may be secured with a fastener 32.

First and second key combination elements 20 and 22 are each pivotable about a pivot axis. This could be a common pivot axis for both elements 20 and 22 (such as L6 in FIG. 1A), or may be separate pivot axes, such as at positions between L6 and L6(C) and between L6 and L6(F) in FIG. 1B.

Reference is now made to FIG. 4, which illustrates a cylinder lock 40, constructed and operative in accordance with a non-limiting embodiment of the present invention. FIG. 4 shows the orientation of first and second key combination elements 20 and 22 when the lock elements of the cylinder lock are aligned along the shear line, as is now explained.

Cylinder lock 40 includes a cylinder lock housing 42 including at least one driver pin 44 movable to a shear line 45. A plug 46 has a keyway 48 and is rotatable relative to the cylinder lock housing 42 along the shear line 45. Plug 46 includes at least one plug pin 50 aligned with the at least one driver pin 44 and movable to the shear line 45. The plug pin and the driver pin may be telescoping pins, as shown.

Insertion of key device 10 into keyway 48 aligns one of the first and second key combination elements (in the illustrative example it is first key combination element 20) with plug pin 50. This key combination element (first key combination element 20) exerts an urging force (due to its spring force) to urge plug pin 50 to shear line 45 to allow rotation of plug 46. The other one of the first and second key combination elements (in the illustrative example it is second key combination element 22) abuts against a portion of plug 46 and not against plug pin 50. It is noted that the spring force of the key combination elements may be due to the resiliency of the element, that is, due to the physical properties of the material (e.g., like a leaf spring) or may be due to an external biasing device acting on the key combination element (e.g., a coil spring or the like that provides the urging force).

It is noted that in the illustrated embodiment, plug pin 50 does not have a uniform length, but instead has an extension 52 that does not completely extend over the entire peripheral end of the pin 50. The first key combination element 20 contacts extension 52. Alternatively, plug pin 50 may have a uniform length with no such extension.

A first biasing device 54 (such as a coil spring) is disposed in cylinder lock housing 42 and is configured to urge driver pin 44 towards the shear line 45. A second biasing device 56 (such as a coil spring placed between an inner telescoping pin 44A and an outer telescoping pin 44B) may be disposed in cylinder lock housing 42 configured to urge driver pin 44 away from the shear line 45. The second biasing device 56 adds to the urging force of the first key combination element 20 to urge plug pin 50 to the shear line 45.

What is claimed is:

1. A key device comprising:

a generally elongate shaft portion having a length and a width that respectively define longitudinal and lateral positions along said elongate shaft portion, said elongate shaft portion comprising first and second oppositely directed side surfaces, at least one of which is cuttable to form key cuts that define a key combination surface; and first and second key combination elements, disposed in said elongate shaft portion, side-by-side one another at different lateral positions along the width of said elongate shaft portion and located at overlapping longitudinal positions along the length of said elongate shaft portion, wherein said first and second key combination elements are each pivotable about a pivot axis, and wherein said first and second key combination elements are independently active biasing elements, capable of providing a biasing force independently from one another.

2. The key device according to claim 1, wherein said first and second key combination elements are capable of resiliently protruding outwards, independently from one another, beyond at least one of said first and second side surfaces.

3. The key device according to claim 1, wherein said pivot axis extends along a width of said elongate shaft portion.

4. The key device according to claim 1, wherein said first and second key combination elements are each pivotable about a common pivot axis.

5. The key device according to claim 1, wherein said first and second key combination elements are each disposed in a recess formed in said elongate shaft portion.

6. The key device according to claim 1, wherein said first and second key combination elements are disposed in a common recess formed in said elongate shaft portion.

7. The key device according to claim 1, wherein said overlapping longitudinal positions are identical longitudinal positions.

8. The key device according to claim 1, wherein each of said first and second key combination elements comprises a pair of resilient arms extending from a common base which is pivotally mounted in an insert mounted in said elongate shaft portion.

9. A key device and lock assembly comprising:

a cylinder lock housing comprising a driver pin movable to a shear line;

a plug having a keyway and rotatable relative to said cylinder lock housing along the shear line said plug comprising a plug pin aligned with said driver pin and movable to the shear line; and a key device comprising a generally elongate shaft portion having a length and a width that respectively define longitudinal and lateral positions along said elongate shaft portion, said elongate shaft portion comprising first and second oppositely directed side surfaces, at least one of which is cuttable to form key cuts that define a key combination surface; and first and second key combination elements, disposed in said elongate shaft portion, side-by-side one another at different lateral positions along the width of said elongate shaft portion and located at overlapping longitudinal positions along the length of said elongate shaft portion, wherein said first and second key combination elements are each pivotable about a pivot axis; and wherein insertion of said key device into said keyway aligns one of said first and second key combination elements with said plug pin to urge said plug pin to the shear line to allow rotation of said plug and the other one of said first and second key combination elements abuts against a portion of said plug and not against said plug pin, and wherein said first and second key combination elements are independently active biasing elements, capable of providing a biasing force independently from one another.

10. The key device and lock assembly according to claim 9, wherein a first biasing device is configured to urge said driver pin towards the shear line and a second biasing device is configured to urge said driver pin away from the shear line.

11. The key device and lock assembly according to claim 10, wherein said first and second biasing devices are disposed in said cylinder lock housing.

12. The key device and lock assembly according to claim 10, wherein said second biasing device adds to an urging force of said one of said first and second key combination elements to urge said plug pin to the shear line.

13. The key device and lock assembly according to claim 9, wherein said plug pin and said driver pin comprise telescoping pins.

* * * * *